United States Patent
Busse et al.

(10) Patent No.: US 8,973,544 B2
(45) Date of Patent: Mar. 10, 2015

(54) CONSTRUCTION OF A HYDRAULIC OIL CHANNEL BETWEEN A CENTRAL VALVE AND A VOLUME ACCUMULATOR OF A CAMSHAFT ADJUSTER

(71) Applicant: Schaeffler Technologies AG & Co. KG, Herzogenaurach (DE)

(72) Inventors: Michael Busse, Herzogenaurach (DE); Jens Schafer, Herzogenaurach (DE); Martin Steigerwald, Herzogenaurach (DE); Jurgen Plate, Gerhardshofen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 61 days.

(21) Appl. No.: 13/746,368

(22) Filed: Jan. 22, 2013

(65) Prior Publication Data
US 2013/0199469 A1    Aug. 8, 2013

(30) Foreign Application Priority Data
Feb. 2, 2012   (DE) .......................... 10 2012 201 567

(51) Int. Cl.
*F01L 1/34*   (2006.01)
*F01L 1/344*  (2006.01)
*F16K 11/07*  (2006.01)
*F16K 31/06*  (2006.01)

(52) U.S. Cl.
CPC ............... *F01L 1/3442* (2013.01); *F16K 11/07* (2013.01); *F16K 31/0613* (2013.01); *F01L 2001/34433* (2013.01); *F01L 2001/34446* (2013.01); *F01L 2001/34479* (2013.01)
USPC ..................................... 123/90.17; 123/90.15

(58) Field of Classification Search
USPC ................................. 123/90.15, 90.17, 90.31
See application file for complete search history.

(56) References Cited

U.S. PATENT DOCUMENTS

2011/0162603 A1*   7/2011   Busse ........................ 123/90.17
2012/0325169 A1   12/2012   Draheim

FOREIGN PATENT DOCUMENTS

DE    102010012479          9/2011
JP       03009009 A    *    1/1991

OTHER PUBLICATIONS

English abstract of JP 03009009 A.*
English abstract of JP (03009009 A (Jan. 1991).*

* cited by examiner

*Primary Examiner* — Zelalem Eshete
(74) *Attorney, Agent, or Firm* — Volpe and Koenig, P.C.

(57) ABSTRACT

A directional control valve (2) for controlling a flow of hydraulic oil from a pressure connection (80) via work chambers of a camshaft adjuster (90) to a tank connection (88). The disclosed directional control valve (2) includes an accumulator connection (86) for guiding at least a part of the hydraulic oil flowing out from a work chamber into a volume accumulator (126) before the discharge into the tank connection (88).

9 Claims, 6 Drawing Sheets

CONSTRUCTION OF A HYDRAULIC OIL CHANNEL BETWEEN A CENTRAL VALVE AND A VOLUME ACCUMULATOR OF A CAMSHAFT ADJUSTER

INCORPORATION BY REFERENCE

The following documents are incorporated herein by reference as if fully set forth: German Patent Application No. 10 2012 201 567.1, filed Feb. 2, 2012.

FIELD OF THE INVENTION

The invention relates to a directional control valve for controlling a flow of hydraulic oil from a pressure connection via work chambers of a camshaft adjuster to a tank connection and also relates to the camshaft adjuster.

BACKGROUND

Camshaft adjusters are technical assemblies for adjusting the phase positions between a crankshaft and a camshaft in an internal combustion engine.

From DE 10 2010 012 479 A1, it is known to control the flow of hydraulic oil by a directional control valve that is screwed centrally into the camshaft and thus simultaneously fixes the rotor of the camshaft adjuster on the camshaft.

SUMMARY

The objective of the invention is to improve the known directional control valve.

This objective is met by one or more features of the invention. Preferred refinements are described below and in the claims.

The invention provides the integration a connection for a volume accumulator of the camshaft adjuster in the directional control valve.

This is based on the idea that a volume accumulator that is connected to the pressure chambers of the camshaft adjuster can be integrated into the camshaft adjuster. If there is an under-pressure of hydraulic oil in the pressure chambers, then this can be equalized by the volume accumulator. An equalization of an over-pressure usually present relative to the volume accumulator can be prevented by a non-return valve.

Forming the basis of this idea is the concept of the invention to supply the volume accumulator with the hydraulic oil that flows out from the pressure chambers of the camshaft adjuster. For this purpose, the oil flowing out from the pressure chambers is not guided to the tank connection but instead to an accumulator connection by which the volume accumulator can be filled with oil. Only after the hydraulic oil has passed the volume accumulator does it flow out via the tank connection.

The invention therefore discloses a directional control valve for controlling a flow of hydraulic oil from a pressure connection via work chambers of a camshaft adjuster to a tank connection that comprises an accumulator connection for guiding at least one part of the hydraulic oil flowing out from a work chamber into a volume accumulator before the discharge into the tank connection.

In one refinement of the invention, the disclosed directional control valve comprises a control piston and a central screw in which the control piston is held. Here, the central screw has a screw shaft and a screw head set on the screw shaft in the axial direction. Through the central screw, the directional control valve can be used not only for controlling the flow of hydraulic oil but also for mounting components of the camshaft adjuster, for example, a rotor.

In an additional refinement of the invention, the accumulator connection comprises a radial hole through the screw shaft of the central screw. The radial hole can be arranged in an axial plane of the screw shaft that is different from an axial plane of the screw shaft in which the work connections or the pressure connection is formed. In this way it is possible to screw the central valve in the camshaft adjuster without orientation, because a peripheral groove can be formed around the radial hole of the accumulator connection, with this groove leading the hydraulic oil into the radial hole from any angular position.

In an alternative or additional refinement of the invention, the accumulator connection comprises a radial hole through the screw head of the central screw. This can be formed as an alternative to or in addition to the radial hole through the screw shaft and can be subjected to the same technical criteria as the radial hole through the screw shaft.

In one special refinement of the invention, the radial hole through the screw shaft is formed in a common axial plane with a connection for supplying the work chambers of the camshaft adjuster with the hydraulic oil. In this way, the central valve and thus also the corresponding components of the camshaft adjuster that sit on the central valve can be formed in an especially space-saving way in the axial direction. Forming the radial hole for the accumulator connection in a common axial plane with the work connections of the camshaft adjuster is especially suitable when the central valve can be screwed oriented in a certain angular position in the camshaft adjuster and the radial hole through the central valve can be set with an accurate fit on a corresponding connection on the rotor or stator that leads the hydraulic oil into one of the pressure chambers of the camshaft adjuster.

In one especially preferred refinement of the invention, the control piston projects past the screw head in the axial direction, wherein the accumulator connection is formed in the axial projecting region of the control piston. In this way, the components of the camshaft adjuster forming the pressure chambers do not have to be widened further in the axial direction, in order to also have the radial hole for the accumulator connection. In addition, the smallest hydraulic resistance and thus losses occur when the hydraulic oil is discharged via the region projecting in the axial direction.

The invention also discloses a camshaft adjuster that comprises a stator for storing rotational energy from a crankshaft of an internal combustion engine, a rotor mounted so that it can rotate in the stator for discharging the rotational energy to a camshaft for controlling the internal combustion engine, and a disclosed directional control valve that can be screwed into the camshaft in the axial direction for mounting the rotor on the camshaft.

In one refinement of the invention, the rotor has a peripheral groove on its inner radial side directed toward the directional control valve in an axial plane intersecting the accumulator connection. Through the peripheral groove, the accumulator connection on the directional control valve is connected to an accumulator connection on the rotor when the directional control valve is inserted in an undefined angular position in the camshaft adjuster.

In another refinement of the invention, the rotor is stepped outward in the radial direction. In this way, for installing the accumulator connection in the disclosed camshaft adjuster, only a region lying lower in the radial direction must be widened in the axial direction, while the radial outer region of the rotor and thus the radial outer region of the stator in which, for example, the cover screws of the camshaft adjuster can be arranged can be held to their original axial length.

In one special refinement of the invention, the stator comprises an axial cover for closing a chamber holding the rotor, wherein the axial cover has an axial chamfer that is oriented, viewed from an axis of rotation, toward the rotor. Through the chamfer the axial cover can collect hydraulic oil from the central valve and forward it to the rotor via the centrifugal forces when camshaft adjuster is operating. In this way, the volume accumulator can be formed in the rotor, wherein the axial cover can be used as a supply line of the volume accumulator.

In one especially preferred refinement of the invention, the axial cover comprises a passage for an actuator moving the control piston and a seal for sealing a radial gap between the passage and the actuator. In this way, losses of hydraulic oil can be kept small on the axial end side of the camshaft adjuster.

BRIEF DESCRIPTION OF THE DRAWINGS

Embodiments of the invention are explained below in more detail with reference to a drawing in which.

DETAILED DESCRIPTION OF THE PREFERRED EMBODIMENTS

In the figures, identical elements are provided with identical reference symbols and are described only once.

Figure 1A:
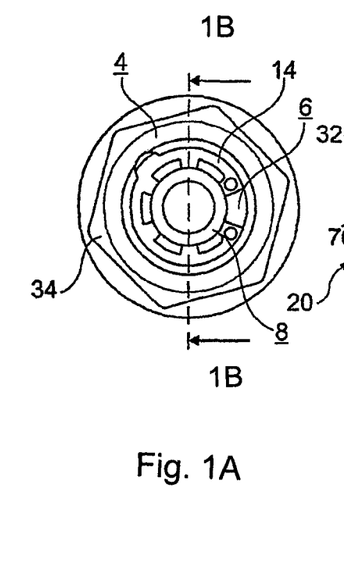
FIGS. 1A and 1B are two views of a central valve in a first position.
Figure 1B:
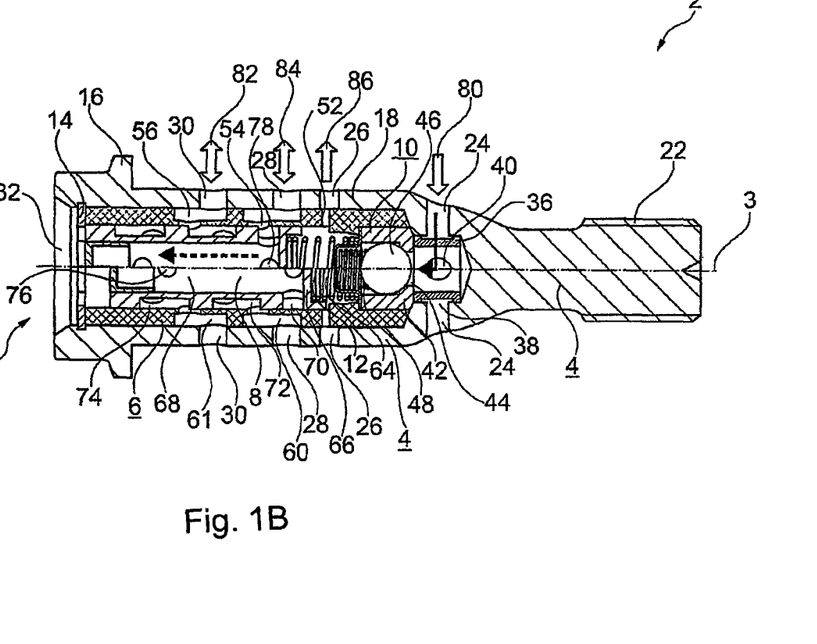
Figure 2A:
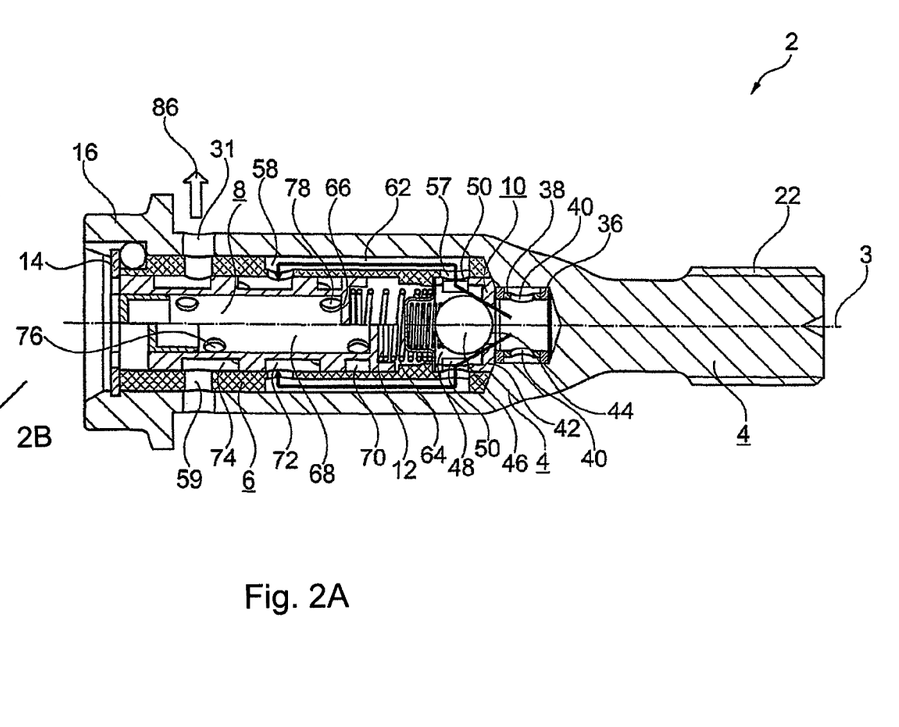
FIGS. 2A and 2B are views of the central valve in a second position.
Figure 2B:
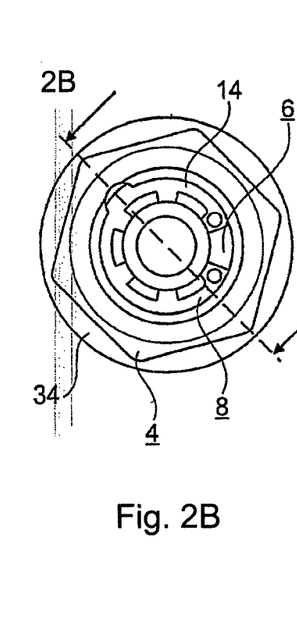

Reference will be made to FIGS. 1A,1B and 2A, 2B. In FIGS. 1A, 1B and 2A, 2B, a central valve 2 is shown in a two projection view. While FIG. 1B shows a section view of the central valve 2 in a first position, FIG. 2B shows a section view of the central valve 2 in a second position that is rotated by 45° relative to the first position. The central valve 2 has a rotationally symmetric construction about an axis of rotation 3. Some elements of the central valve 2 are shown in different axial positions for better illustration of the circumstances in the section views of the central valve 22.

The central valve 2 has a central screw 4, a valve housing 6, a control piston 8, a non-return valve 10, a spring 12, and a retaining ring 14.

The central screw 4 has a screw head 16, a screw shaft 18, and an inner space 20. The screw shaft 18 is adjacent to the screw head 16. On its axial end opposite the screw head 16, an eternal thread 22 is formed that can be screwed into a corresponding nut thread, for example, in a camshaft still to be described. Viewed in the axial direction from the screw shaft 22, first radial central screw holes 24 are formed in a first axial plane of the central screw 4, second radial central screw holes 26 are formed in a second axial plane, third radial central screw holes 28 are formed in a third axial plane, fourth radial central screw holes 30 are formed in a fourth radial plane, and fifth radial central screw holes 31 are formed in a fifth radial plane. An axial central screw opening 32 is guided through the screw head 16 of the central screw 4. The radial central screw holes 24 to 30 and the axial central screw opening 32 open the inner space 20 of the central screw 4 to the outside. The screw head 16 also has a hexagonal area 34 in which a corresponding hexagonal wrench can engage, in order to exert a torque on the central screw.

The non-return valve 10 is held in the inner space 20 of the central screw 4. It is inserted via the axial central screw opening 32 up to an axial end of the inner space 20 of the central screw 4 that lies opposite the axial central screw opening 32. The non-return valve 10 has a hollow cylinder 36 in which a peripheral non-return valve groove 38 is formed. In the non-return valve groove 38, radial non-return valve holes 40 are guided through the hollow cylinder 36. The non-return valve groove 38 lies in the same axial plane in which the first central screw holes 24 lie, so that the non-return valve groove 38 is opened via the first central screw holes 24 to the outside. A ball cage 42 is adjacent to the hollow cylinder 36 in the axial direction. The ball cage 42 has, on its side directed toward the hollow cylinder 36, an axial ball cage opening 44 that contacts a ball 46. The ball is supported on the side opposite the ball cage opening 44 in a ball cage inner space 48 with a spring that is not described in more detail and that presses the ball 46 into the ball cage opening 44. The ball cage inner space 48 is opened via radial ball cage holes 50 to the outside.

In the inner space 20 of the central screw 4, the valve housing 6 is set on the non-return valve 10 in the axial direction. It has first radial valve housing holes 52, second radial valve housing holes 54, third radial valve housing holes 56, fourth radial valve housing holes 57, fifth radial valve housing holes 58, and sixth radial valve housing holes 59. The valve housing 6 also has first axial valve housing grooves 60, second axial valve housing grooves 61, and third axial valve housing grooves 62. Of these elements, only one of each is provided with a reference symbol in FIGS. 1 and 2 for the sake of clarity. While the first radial valve housing holes 52 are arranged in the second axial plane of the second radial central screw holes 26 and the sixth radial valve housing holes 59 are arranged in the fifth axial plane of the fifth central screw holes 31, the second radial valve housing holes 54 are arranged in an axial plane between the third axial plane of the third radial central screw holes 28 and the fourth axial plane of the fourth radial central screw holes 30 and the third radial valve housing holes 56 in an axial plane between the fourth axial plane of the fourth radial central screw holes 30 and the fifth axial plane of the fifth radial central screw holes 31. The second radial valve housing holes 54 are connected via the first axial valve housing grooves 60 to the third radial central screw holes 28, while the third radial valve housing holes 56 are connected via the second axial valve housing grooves 61 to the fourth radial central screw holes 28. Finally, the third axial valve housing groove 62 connects the fourth and fifth radial valve housing holes 57, 58 to each other.

In the interior of the valve housing 6, the control piston 8 is held so that it can move in the axial direction. The control piston 8 is supported in the axial direction against the ball cage 42 with the spring 12, so that a spring space 64 is formed between the ball cage 42 and the control piston 8. The control piston 8 is also closed relative to the spring 12 in the axial direction by a wall 66, so that there can be no exchange of hydraulic fluid between a control piston space 68 and the spring space 64. On the control piston 8 there are also a first peripheral control piston groove 70, a second peripheral control piston groove 72, and a third peripheral control piston groove 74. The first peripheral control piston groove 70 is opened into the control piston space 68 by means of first radial control piston holes 76, while the third peripheral control piston groove 74 is opened into the control piston space

68 by second radial control piston holes 78. The second peripheral control piston groove 72 is not opened into the control piston space 68.

The control piston 8 can be moved from a first axial position to a second axial position, for example, by means of a not-shown central magnet that can contact an axial end of the control piston 8 opposite the spring 12. The spring 12 then pushes the control piston 8 from the second axial position back into the first axial position. In FIGS. 1B and 2B, the first axial position of the control piston 8 is shown above the axis of rotation 3, while the second axial position of the control piston 8 is shown below the axis of rotation 3.

During the operation of the central valve 2, the control piston 8 is moved back and forth for the operation of the camshaft adjuster, in order to fill and empty the pressure chambers of the camshaft adjuster with hydraulic fluid.

By use of a pressure connection 80, a pressurized hydraulic oil can be fed to the central valve 2 by the first central screw hole 24, flowing via the peripheral hollow cylinder groove 38 and the radial hollow cylinder hole 40 into the non-return valve 10. There the oil presses the ball 46 into the ball cage 42 and flows via the radial ball cage holes 50 via the third axial valve housing grooves 62 into the second peripheral control piston groove 72. In this way, the second control piston groove 72 is always supplied with hydraulic oil from the pressure connection 80 regardless of its position.

In the first axial position of the control piston 8, the second control piston groove 72 lies above the third radial valve housing hole 56 in the axial direction. In this way, a first work connection 82 leading to a first pressure chamber of the camshaft adjuster is supplied with the hydraulic oil from the pressure connection 80 of the camshaft adjuster via the fourth radial central screw hole 30. In a way known to someone skilled in the art, a second pressure chamber of the camshaft adjuster discharges hydraulic oil accordingly to a second work connection 84. This discharged hydraulic oil is led via the third radial central screw holes 28 and the first axial valve housing grooves 60 to the second radial valve housing holes 54. At the second radial valve housing holes 54, the axial first peripheral control piston groove 70 holds the hydraulic oil flowing out of the second pressure chamber and leads it via the second radial control piston holes 78 into the control piston space 68. From this space the hydraulic oil flows via the first radial control piston holes 76 into the third peripheral control piston groove 74 into the sixth radial valve housing hole 59 and thus the fifth radial central screw hole 31. At this fifth radial central screw hole 31, there is a volume accumulator connection 86 that leads the hydraulic oil into a volume accumulator of the camshaft adjuster that is provided for equalizing under-pressures in the pressure chambers of the camshaft adjuster.

In the second axial position of the control piston 8, the second control piston groove 72 lies with the hydraulic oil from the pressure connection 80 in the axial direction above the second radial valve housing hole 54, so that the second work connection 84 is provided with hydraulic oil and the hydraulic oil is pressed out of the first work connection 82. In the second axial position of the control piston 8, the third peripheral control piston groove 74 lies simultaneously in the axial direction above the third radial valve housing hole 56 and the sixth radial valve housing hole 59, so that the hydraulic oil is led from the first work connection 82 directly via the third peripheral control piston groove 74 into the volume accumulator connection 86.

For venting the spring space 64, a tank connection 88 can also be provided that vents the spring space 64 via the first radial valve housing hole 52 and the second radial central screw hole 26.

In the present construction, the hydraulic oil is led through the screw shaft to the volume accumulator connection 86 of the central screw.

Figure 3:
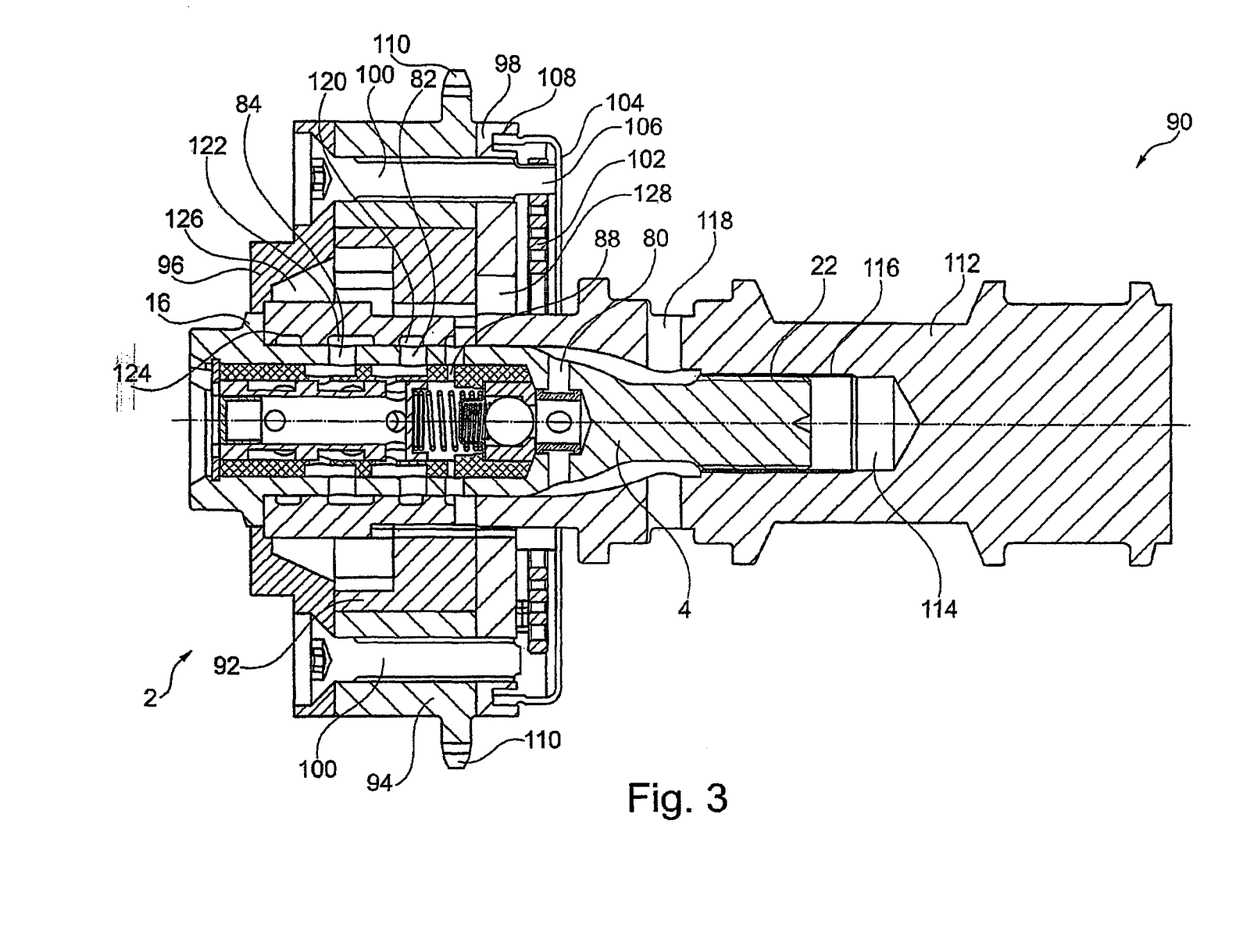
FIG. 3 is a section view of a camshaft adjuster with the central valve of FIGS. 1 and 2.

Forwarding the hydraulic oil into the volume accumulator is explained in more detail with reference to FIG. 3 that shows a section view of a camshaft adjuster 90 with the central valve 2 of FIGS. 1B and 2B. In FIG. 3, some elements of the central valve 2 that were already described in FIGS. 1A, 1B and 2A, 2B are no longer provided with reference symbols.

In addition to the central valve 2, the camshaft adjuster 90 has a rotor 92 set on the central valve 2 in the axial direction, a stator 94 in which the rotor 92 is held, a front cover 96 set on the stator 94 in the axial direction, a back cover 98 set on the stator 94 in the axial direction, screws 100 for screwing the cover 96, 98 on the stator 94, a spiral spring 102 clamped between the rotor 92 and the stator 94, and a spring cover 104 covering the spiral spring 102.

The rotor 92 is held in the stator 94 in the axial direction. The front cover 96 and the back cover 98 are set on the stator 94 in the axial direction and screwed on with the screws 100. Together with the stator 94, the rotor 92 forms the pressure chambers that were already mentioned in the scope of FIGS. 1 and 2 in a way known to someone skilled in the art.

One of the two screws 100 shown in FIG. 3 has an axial extension 106 on its tip in which the spiral spring 102 is suspended on the stator side. On the rotor side, the spiral spring 102 can be suspended on slots that are not shown in more detail. The back cover 98 also has a peripheral slot 108 in which the spring cover 104 is clamped in the radial direction.

The stator 94 also has, on its periphery, teeth 110 in which a driving means, for example, a chain, driven by a not-shown crankshaft of an internal combustion engine can engage, in order to turn the stator 94. The rotor 92 is clamped in the axial direction between the screw head 16 of the central screw 4 and a camshaft 112 and is thus connected rigidly to the camshaft. In this way, the rotational energy received from the stator 94 is transmitted from the crankshaft via the rotor 92 to the camshaft 112.

For clamping the rotor 92 between the screw head 16 and the camshaft 112, the camshaft 112 has an axial inner space 114 that is opened toward the camshaft adjuster 90 and on whose end an internal thread 116 is formed. The external thread 22 of the central screw 4 is screwed into this internal thread 116, so that the rotor 92 can be clamped rigidly between the screw head 16 and the camshaft 112.

Hydraulic oil can be filled into the inner space 114 via a radial hole 118 through the camshaft 112 and led to the pressure connection 80. On a side of the rotor 92 directed toward the central valve 2, a first peripheral groove 120, a second peripheral groove 122, and a third peripheral groove 124 are formed. The first and second peripheral grooves 120, 122 lie on the first and second work connection 82, 84 in the radial direction accordingly and distribute the hydraulic oil flowing to the pressure chambers or from the pressure chambers in the peripheral direction around the central screw 4, so that the hydraulic oil can always flow out from or into the corresponding radial central screw holes 28, 30 regardless of the angular position of the central screw 4 relative to the rotor 92.

In the same way, the third peripheral groove 124 contacts, in a not-shown way, the volume accumulator connection 84. From the third peripheral groove 124, a radial hole not shown in FIG. 3 leads through the rotor 92 into a volume accumulator 126 that is formed between the rotor 92 and the front cover 96 and provides the under-pressure compensation in the pressure chambers of the camshaft adjuster 90. Excess hydraulic oil is guided from the volume accumulator 126 via an outlet 128 from the camshaft adjuster 90 to which the tank connection 86 of the central valve 2 is also connected.

In the present construction, the rotor 92 is stepped in the radial direction. The front cover 96 is set on the rotor 92 inclined relative to this rotor in the radial direction. In this way, the hydraulic fluid in the volume accumulator 126 slides during the operation of the camshaft adjuster 90, when this is turning, due to the centrifugal forces acting on the hydraulic fluid and the shape of the front cover 96 to the automatic rotor 92.

Figure 4:
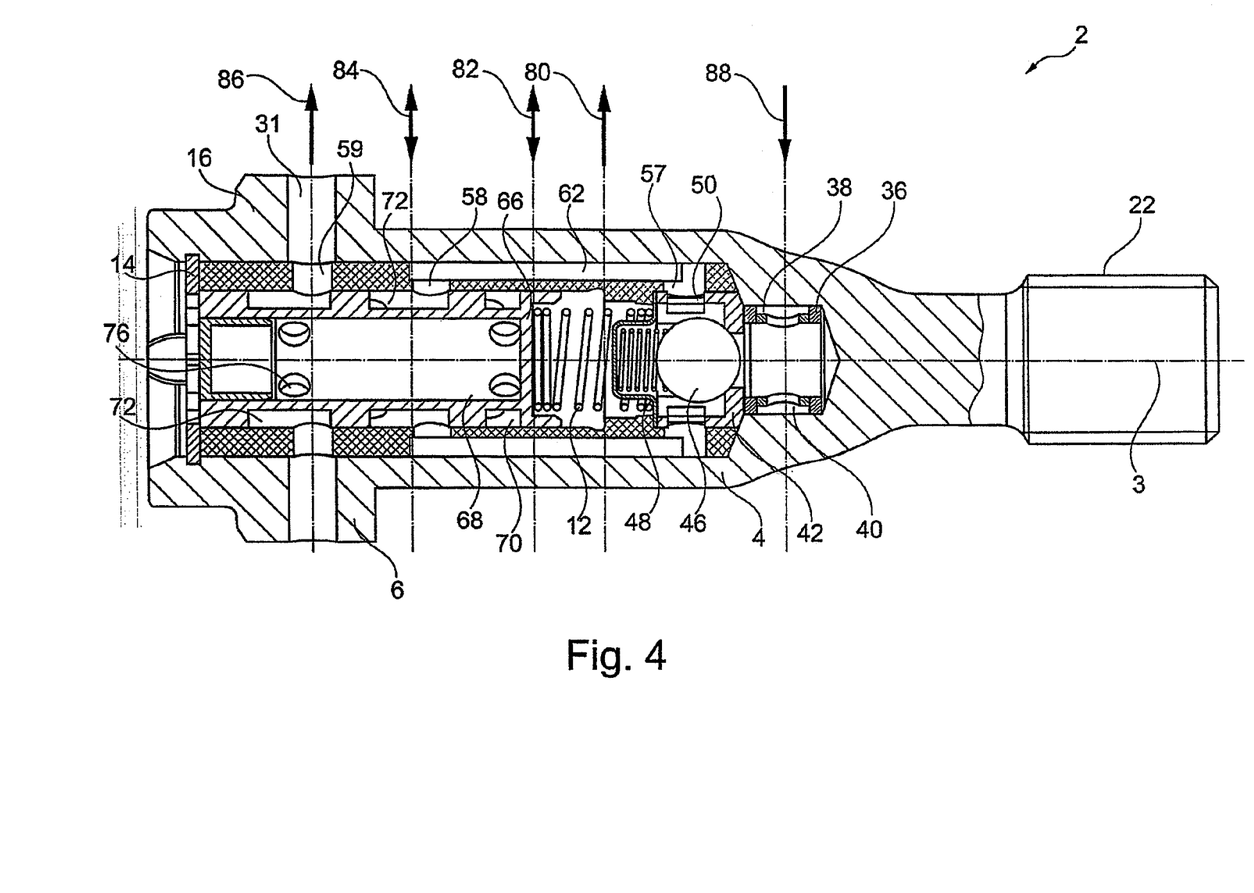
FIG. 4 is a section view of another central valve.
Figure 5:
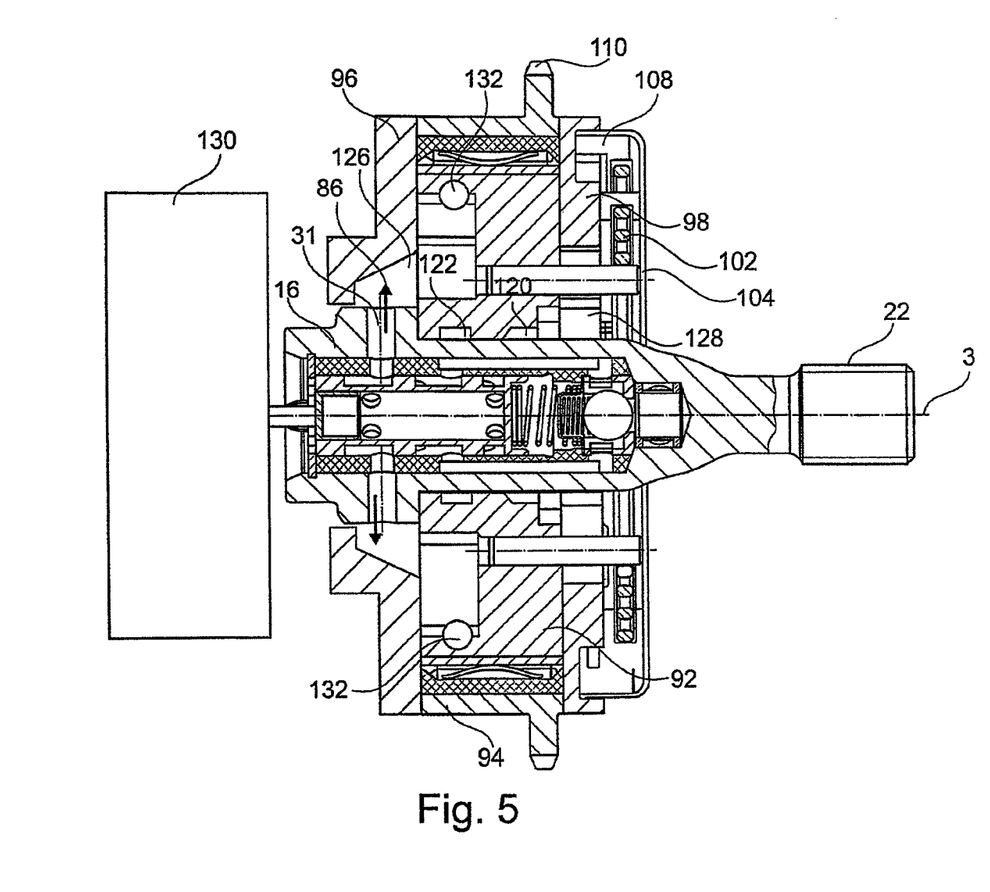
FIG. 5 is a section view of a camshaft adjuster with the central valve of FIG. 4.

In FIG. 4, a section view of another central valve 2 is shown, while in FIG. 5 a section view of a camshaft adjuster 90 with the central valve 2 of FIG. 4 is shown. The position of the central valve 2 in FIG. 4 corresponds to the position of the central valve 2 in FIG. 2B.

In the construction of FIGS. 4 and 5, the fifth radial central screw hole 31 is guided through the screw head 16 of the central screw 4. In this way, the rotor 92 can have a shorter axial construction. The volume accumulator 126 is bounded in the present construction by the screw head 16, the rotor 92, and the front cover 96.

In FIG. 5, a central magnet 130 is also shown for the axial movement of the control piston 8 in the way named above, as well as non-return valves 132 in the volume accumulator 126 for supplying the pressure chambers with hydraulic oil in the event of an under-pressure.

Figure 6:
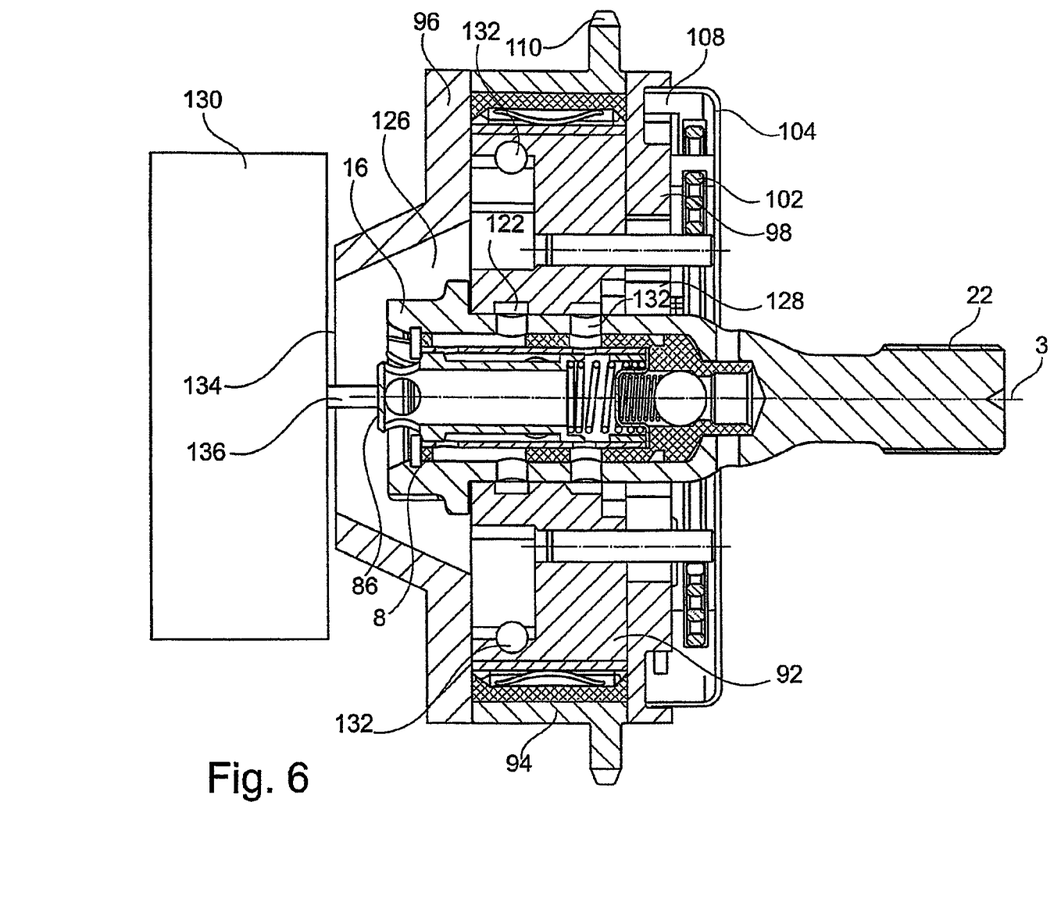
FIG. 6 is a section view of another central valve.

In FIG. 6, a section view of a camshaft adjuster 90 with a modified central valve 2 of FIG. 4 is shown. The position of the central valve 2 in FIG. 6 corresponds to the position of the central valve 2 in FIG. 1B.

In FIG. 6, the volume accumulator connection 86 is formed in the axial head of the control piston 8. The hydraulic oil flowing from the pressure chambers via the work connections 82, 84 flows via this volume accumulator connection 86 into the front cover 96, wherein the hydraulic oil is led, as in the previous embodiments, by the centrifugal force generated during the operation of the camshaft adjuster 90 to the rotor 92 and the corresponding non-return valves 132 to the pressure chambers.

A gap 134 between a passage through the front cover 96 and a tappet 136 of the central magnet 130 should be sealed in this way, in order to keep any oil loss as low as possible.

LIST OF REFERENCE NUMBERS

2 Central valve
3 Axis of rotation
4 Central screw
6 Valve housing
8 Control piston
10 Non-return valve
12 Spring
14 Retaining ring
16 Screw head
18 Screw shaft
20 Inner space
22 Outer thread
24 Radial central screw hole
26 Radial central screw hole
28 Radial central screw hole
30 Radial central screw hole
31 Radial central screw hole
32 Axial central screw opening
34 Hexagonal area
36 Hollow cylinder
38 Peripheral non-return valve groove
40 Radial non-return valve hole
42 Ball cage
44 Ball cage opening
46 Ball
48 Ball cage inner space
50 Radial ball cage hole
52 Radial valve housing hole
54 Radial valve housing hole
56 Radial valve housing hole
57 Radial valve housing hole
58 Radial valve housing hole
59 Radial valve housing hole
60 Axial valve housing groove
61 Axial valve housing groove
62 Axial valve housing groove
64 Spring space
66 Wall
68 Control piston space
70 Control piston groove
72 Control piston groove
74 Control piston groove
76 Radial control piston hole
78 Radial control piston hole
80 Pressure connection
82 Work connection
84 Work connection
86 Volume accumulator connection
88 Tank connection
90 Camshaft adjuster
92 Rotor
94 Stator
96 Front cover
98 Back cover
100 Screw
102 Spiral spring
104 Spring cover
106 Axial extension
108 Peripheral slot
110 Teeth
112 Camshaft
114 Inner space of the camshaft
116 Inner thread
118 Radial hole through the camshaft
120 Peripheral groove on the rotor
122 Peripheral groove on the rotor
124 Peripheral groove on the rotor
126 Volume accumulator
128 Outlet for tank connection
130 Central magnet
132 Non-return valve
134 Gap
136 Tappet

The invention claimed is:

1. A directional control valve for controlling a flow of hydraulic oil from a pressure connection via work chambers of a camshaft adjuster to a tank connection, comprising an accumulator connection for guiding at least one part of the hydraulic oil flowing out from a work chamber of the camshaft adjuster into a volume accumulator before being discharged into the tank connection, a control piston, and a central screw in which the control piston is held, wherein the central screw has a screw shaft and a screw head located in an axial direction on the screw shaft.

2. The directional control valve according to claim 1, wherein the accumulator connection comprises a radial hole through at least one of the screw shaft or the screw head of the central screw.

3. The directional control valve according to claim 2, wherein the radial hole is provided through the screw shaft and is formed in a common axial plane with a connection for supplying the work chambers of the camshaft adjuster with the hydraulic oil.

4. The directional control valve according to claim 1, wherein the control piston projects in the axial direction past the screw head and the accumulator connection is formed in a region of the control piston projecting in the axial direction.

5. A camshaft adjuster comprising a stator for receiving rotational energy from a crankshaft of an internal combustion engine, a rotor mounted for rotation in the stator for discharging the rotational energy to a camshaft for controlling the internal combustion engine, and a directional control valve according to claim 1 that can be screwed into the camshaft in an axial direction for mounting of the rotor on the camshaft.

6. The camshaft adjuster according to claim 5, wherein the rotor has, in an axial plane intersecting the accumulator connection, a peripheral groove on an inner radial side thereof directed toward the directional control valve.

7. The camshaft adjuster according to claim 6, wherein the rotor is stepped outward in the radial direction.

8. The camshaft adjuster according to claim 5, wherein the stator comprises an axial cover for closing a chamber holding the rotor, and the axial cover has an axial chamfer that is shaped, viewed from an axis of rotation, toward the rotor.

9. Camshaft adjuster according to claim 8, wherein the axial cover comprises a passage for an actuator that moves the control piston and a seal for sealing a radial gap between the passage and the actuator.

* * * * *